United States Patent [19]

Persoon et al.

[11] Patent Number: 4,501,016
[45] Date of Patent: Feb. 19, 1985

[54] DEVICE FOR THE DYNAMIC ADJUSTMENT OF A BLACK/WHITE DISCRIMINATION THRESHOLD FOR THE PROCESSING OF IMAGES CONTAINING GREY VALUES

[75] Inventors: Eric H. J. Persoon, Eindhoven, Netherlands; Ratnayake M. S. S. Abeysekera, Nugegoda,

[73] Assignee: U.S. Philips Corporation, New York, N.Y.

[21] Appl. No.: 443,768

[22] Filed: Nov. 22, 1982

[30] Foreign Application Priority Data

Nov. 20, 1981 [NL] Netherlands ............... 8105256

[51] Int. Cl.³ .................................... G06K 9/48
[52] U.S. Cl. ........................ 382/22; 382/52; 382/53
[58] Field of Search ............... 382/22, 52, 53; 358/282; 364/513; 356/376

[56] References Cited

U.S. PATENT DOCUMENTS 4,064,484 12/1977 Mese et al. ................... 382/53
4,399,469 8/1983 Lew ............................ 358/282
4,446,486 5/1984 Itch ............................ 382/53

Primary Examiner—Leo H. Boudreau
Assistant Examiner—Michael Murray
Attorney, Agent, or Firm—Jack Haken; James J. Cannon, Jr.

[57] ABSTRACT

A device for binarizing an image consisting of grey values by means of a dynamically adjusted black/white discrimination threshold comprises:
 a. a generator (74) for determining a discrimination threshold each time for a first local sub-set of pixels;
 b. an edge detector (90) for determining a local edge between darker and lighter pixels from a second local sub-set of pixels, associated with a first local sub-set of pixels, in order to form an accept signal, and otherwise a reject signal; and
 c. a discriminator (64) for presenting, on the basis of a grey value and the relevant discrimination threshold, alternatively a black or a white signal.

10 Claims, 26 Drawing Figures a

DEVICE FOR THE DYNAMIC ADJUSTMENT OF A BLACK/WHITE DISCRIMINATION THRESHOLD FOR THE PROCESSING OF IMAGES CONTAINING GREY VALUES

The invention in general relates to a device for the dynamic adjustment of a black/white discrimination threshold for the processing of images containing grey values. An image is to be understood to mean herein an amount of information which is derived from an object and which is regularly arranged according to two co-ordinates. The information may have been derived by means of optical means or other means, such as a scanning electron microscope or a radio-telescope. Dynamic adjustment is to be understood to mean herein an operation for which the discrimination threshold may differ from one image to another as well as from one location to another within the same image. The invention notably relates to a device for the dynamic adjustment of a black/white discrimination threshold for the processing of images which are composed of a matrix of pixels which each contain a grey value and which are arranged in rows and columns of the matrix, said device comprising:

a. a first input for receiving the grey values;
b. a threshold generator which comprises:
b1. first means for receiving the grey values of a first sequence of first local sub-sets of pixels and for determining for each local sub-set a local black/white threshold for presentation on a first output;
c. a discriminator for presenting alternatively a black or a white signal on a second output by comparison of the grey value of a pixel with the local black/white threshold applicable to the relevant pixel. A device of this kind is known from U.S. Pat. No. 3,502,993, notably for the evaluation of essentially bivalent signals on a carrier. For example, the background is "white" and the signals, for example, characters, are "black". A dynamically varying discrimination threshold is determined by performing an averaging operation on the signals of the background and the characters. The characters can subsequently be recognized in an appropriate manner. The effect of the known device is inadequate when an image which essentially consists of multivalent signals is to be processed. In the case, of, for example, trivalent signals, two successive signal transitions can occur in the same direction, i.e. successively from "white" to "grey" and from "grey" to "black", both signal transitions containing relevant information concerning the image (for example, on a white background there is situated a grey object which is partly covered by a black object). In given environments, for example, an industrial environment, it may be necessary to recognize a given functional transition, for example, the contour of an object. This object can be gripped by a robot once the orientation is known. In such cases it is often impossible to choose a value for the discrimination threshold in advance. On the other hand, for cost considerations it is often impossible to perform the operations, such as recognition of the shape, directly on the basis of the grey values. This is highly problematic in view of the additional storage capacity required; moreover, the recognition and other logic operations are much more complex. Furthermore, in many cases image processing must take place in real-time with the scanning operation. The conversion into a black/white image then offers an attractive reduction of the necessary processing speed which is measured in bits per unit of time. In order to enable a black/white decision to be made with local adjustment of the discrimination threshold while artefact transitions in the discrimination result are indicated as such and, moreover, noise can be eliminated in many cases, all said operation being possible with real-time processing, the invention is characterized in that the threshold generator comprises:

b2. an edge detector which comprises a second input which is connected to said first input in order to receive the grey values of a second sequence of second local sub-sets of pixels for the detection of a local edge between darker pixels and lighter pixels, thus forming an accept signal on a third output, but forming a reject signal on the third input in the absence of such a local edge; there also being provided:

d. time control means for presenting a black/white signal of a pixel on the basis of a first local sub-set of pixels to the second output together with the accept/reject signal on the third output which has been generated on the basis of a second local sub-set of pixels associated with said first local sub-set of pixels. Such an artefact transition is then invalidated by the reject signal and need not be taken into account for the further processing of the image. An artefact transition can occur in a sequence of two successive jumps white/grey and grey/black. These jumps can be found back in a binary image only if two 0/1 transitions (from light to dark) are separated by an artefact transition 1/0. The latter is then invalidated and ignored during further processing of the image. Furthermore, the time control means correlate a black/white signal and the associated accept/reject signal. The first and the second local sub-set are associated in that they have a given image zone in common. The zones in which the relevant sub-sets have pixels may be of different size and each sub-set may also relate to different pixels in the common zone. Thus, a black/white bit plus an accept/reject bit exists for each output pixel.

Preferably, the locally determined threshold value is formed as a mean value of the maximum and minimum grey values within the first local sub-set. The mean value can be formed in an arithmetical, geometrical or other manner. This offers a simple realization in many cases.

Preferably, the edge detector determines an edge under the control of a difference between a minimum grey value in a first sub-set and a maximum grey value in a second sub-set within said second local sub-set. If the changes of the grey values occur as marked steps in the image, such a determination is sufficiently accurate; if such an edge intersects the sub-set of pixels, an accept signal will be formed for this sub-set. If this is not so, a black signals/white signals transition will be recognized as an artefact transition. However, if only small changes occur in the grey values, smaller than the variation within a sub-set, a reject signal is formed.

Preferably, a first local sub-set of pixels each time coincides with a second local sub-set of pixels. This can be simply implemented.

Preferably, after the first input and before further processing means there is arranged a resolution enhancer for forming, for each pixel received, a larger number of $m \times n$ secondary pixels of an $m \times n$ sub-matrix which is situated at the area of the pixel received, the secondary grey values of the secondary pixels being formed by means of $m \times n$ interpolation operations on the grey value of the pixel received and on the grey values of a third local sub-set of pixels which directly adjoin the pixel received. Each pixel is thus converted into a larger number of secondary pixels. The variation of the grey value in the image thus filtered thus becomes smoother. More information can then be stored in the ultimate, binarized image. The original grey values also indicate the shape of an edge in that each grey value represents an elementary part of the image. When this part is intersected by an edge, the ultimate grey value will still be co-determined by the location where the edge intersects the relevant elementary part of the image. This information can thus be better retained, so that the resultant image is smoother. Preferably, $m=n=2$, but higher values may also be used. Either m or n may also be equal to 1.

To the input of the threshold detector there is preferably connected a low-pass filter for receiving the grey values of a sequence of third local sub-sets of pixels and for performing an averaging operation thereon. Notably in combination with steps which take into account the maximum and minimum grey value within a local sub-set, a reduced susceptibility to noise is thus obtained, so that the edge detector can correctly detect the edge, even in the presence of a substantial amount of noise. The low-pass filter may render the resolution superfluous in some cases. However, some information will then be lost.

Preferably, said first means and the edge detector are constructed as a tree structure consisting of two-input arithmetic elements, each time two outputs of arithmetic elements of a higher level in the tree structure being connected to the relevant inputs of a single arithmetic element of a lower level in the tree structure. This results in a modular construction which may be formed from inexpensive, standard components.

Preferably, the threshold generator also comprises: a memory which comprises a third input which is connected to the first output and to a fourth output in order to buffer a local black/white threshold, and a difference determining device which comprises a fourth and a fifth input for comparing the local black/white thresholds on the first and the fourth output and, when a predetermined difference between said local black/white thresholds is exceeded, for supplying the memory with a storage control signal in order to store a new local black/white threshold for presentation to said discriminator. Additional storage of the local black/white threshold can thus be attractively realized; small and/or incidental changes of the grey values can then be ignored for the determination of this black/white threshold.

Preferably, when said difference is not zero but exceeds a second predetermined difference, the difference-determining device supplies an increment/decrement signal in order to increment/decrement the stored local black/white threshold in the same direction as the variation of the grey values. The situation may become more complex. When images are processed which have been detected with illumination which is not uniform. A white/grey transition in a brightly illuminated part of the image may then functionally correspond to a grey/black transition in a weakly illuminated part of the image. Thanks to the described mechanism, the gradient in the image may be smoother, without giving rise to artefact edges. Otherwise problems could arise in the case of a high mean gradient in, for example, the x-direction and a small mean gradient in the y-direction; this could also lead to directional deviations between the actual edge and the detected edge. The described step offers an improvement.

BRIEF DESCRIPTION OF THE FIGURES

The invention will be described in detail hereinafter with reference to some Figures; attention will be successively paid to the problems solved by the invention with special emphasis on a one-dimensional and a two-dimensional situation, a diagrammatic representation of a preferred embodiment of a device in accordance with the invention, and a number of essential parts of such a device.

PROBLEMS TO BE SOLVED BY THE INVENTION.

Figure 1:
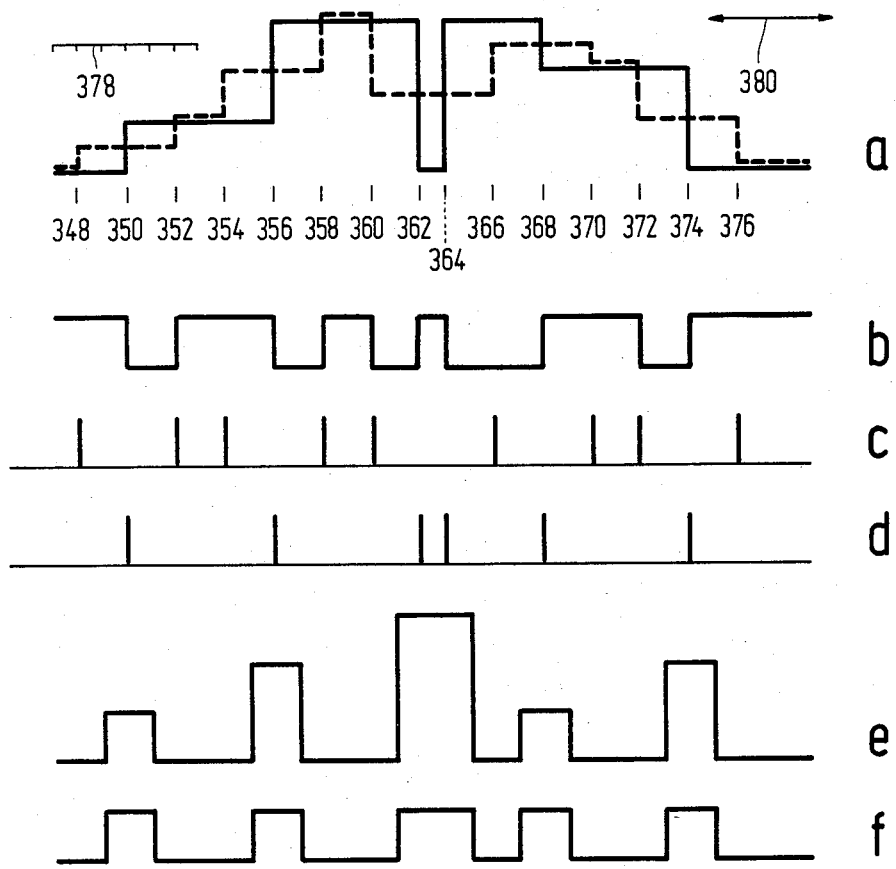
FIGS. 1a . . . 1f illustrate the problems solved by the invention for a one-dimensional situation, FIGS. 2a, b illustrate the problems solved by the invention in a two-dimensional situation.
Figures 2A, 2B:
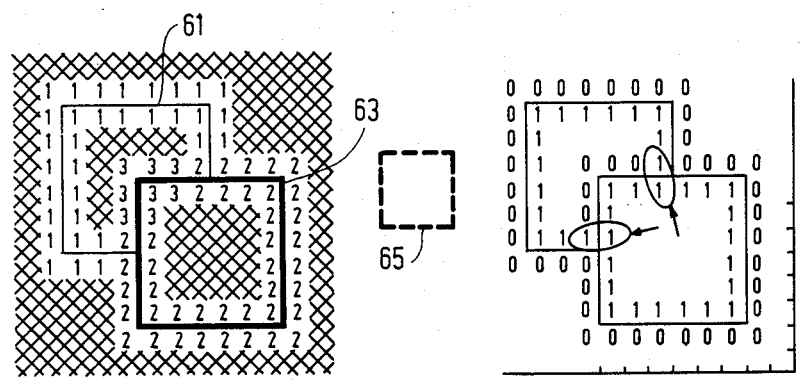

FIGS. 1a . . . 1f illustrate the problems solved by the invention in a one-dimensional situation. The Figure concerns a simulation. The non-interrupted line denotes the sequence of signals which represent the grey values; in this simple example only four different grey values occur. The amplitude is plotted in the vertical direction. At the indication 378, a scale denotes the period of the pixels; each graduation indicates one pixel. An arrow at the indication 380 denotes the dimension of the first local sub-set of five pixels. In other cases it may be advantageous to save components by omitting one or more pixels from the relevant first or second local sub-set of pixels within a non-interrupted sequence of pixels. The reference numerals on the horizontal axis (348 . . . 376) indicate special points in the curves and are not equidistant. The interrupted line represents the value of the discrimination threshold between black and white: for each pixel, this threshold is determined as the mean value of the highest and the lowest grey value for the first local sub-set in which relevant pixel is the central pixel. Thus, each pixel also belongs to five successive first local sub-sets. The discrimination threshold is always constant in a given range, for example, between the indications 348/352, 352/354, etc. At the indications 352, 354, 358 . . . each time a jump occurs in the discrimination value. If the local grey value is higher than the discrimination value in FIG. 1a, the ultimate result is "binary black". If the local grey value is lower than or equal to the discrimination value (black/white threshold), the ultimate result is "binary white". The variation of the binarized grey value is shown in FIG. 1b; this Figure shows ten transitions between the binary results. FIG. 1c shows pulse-shaped signals which correspond to the positions of the step-wise variation of the discrimination values (352, 354, 358): they invalidate the associated signal transitions in FIG. 1b, because these transitions concern artefacts which are caused only by the binarizing of the signals. In this simple case, differentiation means the detection of an edge between a darker and a lighter pixel, so on the basis of a second local sub-set of only two pixels. FIG. 1d shows pulse-shaped signals which correspond to the remaining, valid signal transitions in FIG. 1b. In this simple case, an artefact blocking signal or reject signal (FIG. 1c) can be derived by differentiation of the signal of the discrimination threshold and by applying this signal to a logic circuit together with the differentiation result of FIG. 1b. FIG. 1e shows the result of a further algorithm for the detection of the formation of artefact edges in order to counteract such edges; this Figure shows the difference between the highest grey value and the lowest grey value within each second local sub-set of each time three successive pixels. In accordance with FIG. 1f, this difference is converted into a bivalent signal (compared with a threshold value). An edge signal detected on the basis of FIG. 1b may be valid only if the signal in FIG. 1f has the higher value. It is to be noted that FIG. 1 merely serves to illustrate the idea of the invention; the invention, however, does not concern the one-dimensional application according to FIG. 1. FIGS. 2a, 2b illustrate the problems solved by the invention in a two-dimensional situation. The image is formed by two objects: a square 61 having a low grey value 2 and a square 63 having a high grey value 4. The background has the grey value 0. The objects partly overlap. For the sake of brevity, the information of the unprocessed image is not separately shown. The discrimination threshold is determined as the mean (arithmetical) value of the highest and the lowest grey value within a first local sub-set of 3×3 pixels (dimension indicated at 65). Furthermore, in each second local sub-set of again 3×3 pixels the difference is determined between the highest and the lowest grey value for comparison with a threshold value 1. If the difference is smaller than 1, a reject or artefact-blocking signal is formed; this is indicated by cross-hatching (FIG. 2a). The discrimination threshold is also indicated for each pixel. FIG. 2b shows the resultant black/white signal for the pixels for which an accept signal is present. Nothing is indicated for the other pixels. Generally, in this multivalent image all edge points can again be detected as a difference between two neighbouring pixels. An arrow indicates two cases for which the edge cannot be detected. It has been found that such intersecting edges occur rather seldom in practice and that the recognition of shapes is not disturbed thereby. It is to be noted that in FIG. 2b a "1" is formed when the grey value and the threshold are equal. Otherwise the edge could not be detected at some other locations.

GENERAL SET-UP OF PREFERRED EMBODIMENTS

Figure 3:
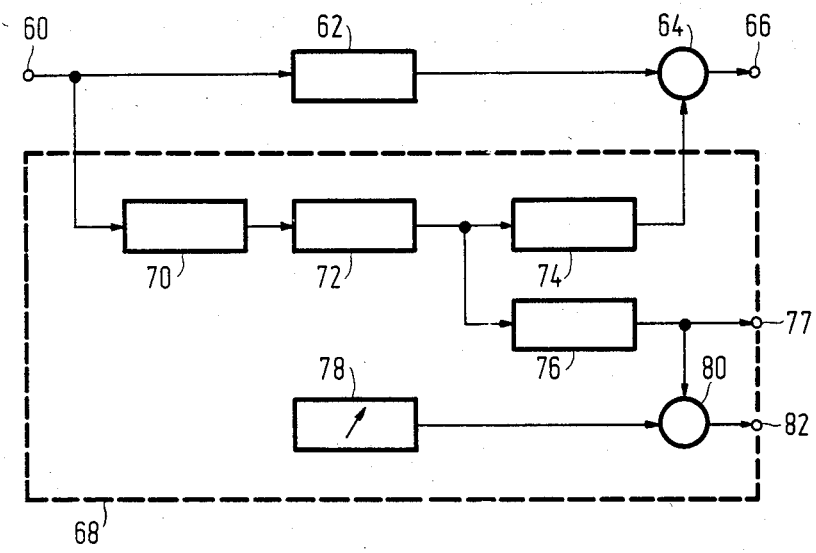
FIG. 3 shows a general block diagram of a device in accordance with the invention.

FIG. 3 shows a general set-up of a device in accordance with the invention in the form of a block diagram. Input 60 receives the input signals which represent the grey values of the pixels. These values may be in analog or digital form, for example, coded in accordance with 32 ($=2^5$) successively grey levels. This signal may first be applied to an initial filter (not shown). This filter can be used for the correction of any image defects, for example, so-called dropouts; these dropouts are pixels for which a grey value has been detected which deviates completely from that of all surrounding points. The invention does not relate to such initial filtering per se. The signal thus filtered is first applied to the low-pass filter 70 which serves to reduce noise phenomena in the image: a substitute grey value is formed for each pixel by averaging over the grey value of a number of neighbouring points, for example, as 1/6×(the sum of twice their own grey value, increased by the grey values of the four directly neighbouring pixels arranged in rows and columns). The adverse effect of noise on the image is thus reduced. Element 72 is a maximum/minimum determining device for the grey values of a local sub-set of pixels. In an organization according to a tree structure, this device can each time select the higher one and the lower one of two grey values applied in order to supply these values to a next level of the tree structure. Ultimately, the absolute maximum and the absolute minimum are found. Subsequently, the next local subset of pixels is considered. Thus, the first and the second local sub-set are identical in this case. As has already been stated with reference to FIG. 1, this need not be strictly the case. The maximum/minimum determining device 72 presents its results to the elements 74, 76 via a double line or, alternatively, with a single line carrying alternatingly the maximum and the minimum grey value. Element 74 is the threshold generator; the actual threshold value is determined as the arithmetical means value of the maximum grey value and the minimum grey value within the relevant first local sub-set. This discrimination threshold value is applied to comparison element 64. This element is connected to the input 60 via a delay element 62. The delay element serves to compensate for the delay which occurs among the instants at which the grey values of the sub-set of pixels for the relevant pixel become available in the maximum/minimum determining device 72. This delay must be by image lines as well as by pixels, for example, by means of series-connected image line delay elements and pixel delay elements such as shown, for example, in FIG. 6 (102, 104). Comparison device (discriminator) 64 outputs alternatively a black or a white output signal on output 66, depending on whether the grey value received is higher or lower than the discrimination threshold received from the threshold generator 68. Element 76 is a difference-determining device which determines the difference between the maximum and the minimum grey value of the actual second local sub-set of pixels. This variable, being a measure for the local contrast, is output on output 77, for example, as a five-bit variable when the grey values also consist of five bits. Element 78 is an adjustable value generator which generates a predetermined contrast value. When the grey values are coded as five bits, this contrast value is, for example, 00100. Like the element 64, element 80 is a comparison element which indicates whether the local contrast is higher or lower than the contrast value presented by the generator 78. If the signal "higher than" appears on output 82, it acts as an accept signal in order to indicate that the signal on the output 66 is relevant. If the signal on the output 66 is not relevant (for example, at the area of the indication 352 in FIG. 1), a local black/white transition may not be taken into account for recognition and/or other processing of the image. In FIG. 3, the delay introduced by the element 62 would roughly correspond to half the delay time of a second local sub-set of pixels. The situation in a two-dimensional case is more complex and will be described with reference to a more detailed diagram in order to take into account the differences between the instants of presentation to the input 60.

Figure 4:
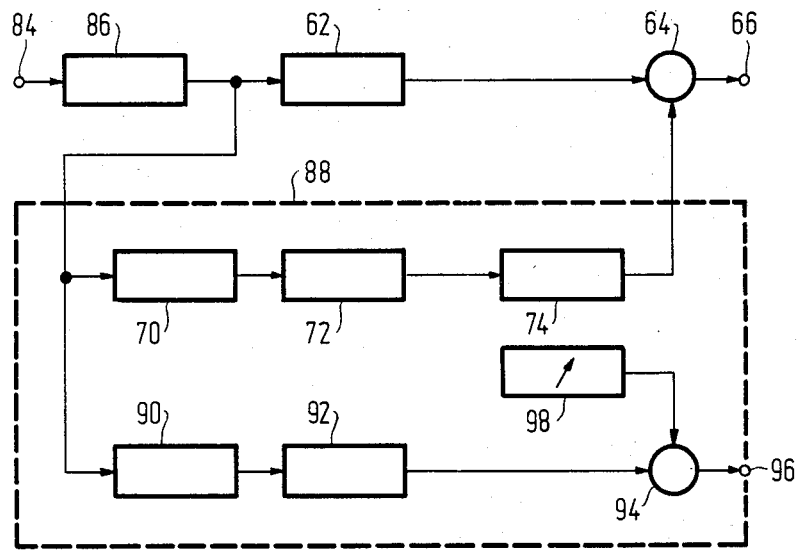
FIG. 4 shows a second embodiment of such a device, FIGS. 5a, b show a third embodiment of such a device.

FIG. 4 shows a further block diagram which is similar to that shown in FIG. 3. The corresponding parts 62, 64, 66, 70, 72, 74 are denoted by the same reference numerals. In this case terminal 84 acts to receive the grey values. Element 86 is a resolution enhancer for converting each grey value of a pixel into n×m grey values of secondary pixels of an n×m sub-matrix. In a simple case, n=m=2. The grey values are also filtered in accordance with an interpolation rule, for example, by square interpolation: first all n×m secondary pixels are assigned the same grey value as the original single pixel, and subsequently they are approximated by a second-order interpolation. It has been found that thus a smoother binarized image is obtained while the information can still be processed with the same ease. The threshold generator 88 also comprises an edge detector 90 which each time locally determines, on the basis of a second local sub-set of pixels, whether an edge is present. For this purpose these pixels may be subjected to various operators or conditions. Element 92 is a delay element similar to the element 62 and serves to ensure that the signals on the outputs 66, 96 relate to the same position in the image. The element 92 supplies a quantitative variable to the comparison element 94 which indicates the degree of presence of an edge. This variable is comparable in the element 94 with a reference variable produced by the value generator 98. In this case it need not have the dimension of a grey value. The signal on output 96 indicates whether the signal appearing on the output 66 is relevant.

Figure 5A:
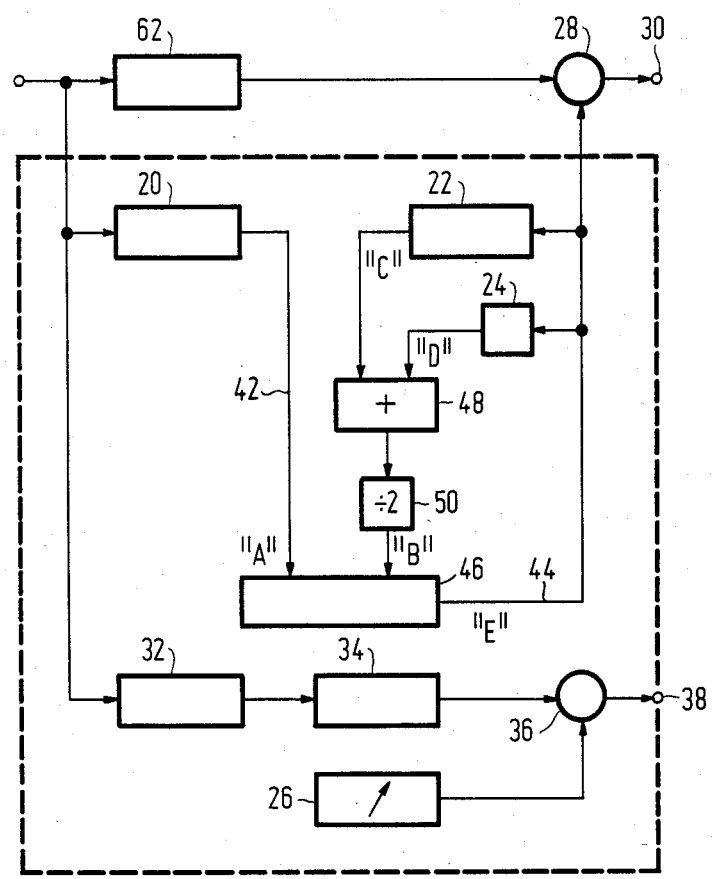
Figure 5B:
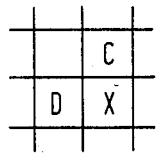

FIG. 5a shows a third block diagram which is similar to that shown in FIG. 4. Corresponding parts are denoted by corresponding reference numerals. The element 20 receives the grey values of a first local sub-set of pixels and determines therefrom a mean grey value which appears on line 42. For example, the operation in element 20 can be performed completely with analog grey values. In this embodiment it is assumed that the image is scanned according to television or similar scanning lines: per line from left to right, the lines succeeding one another in the direction from the top downwards. The signal "A" is applied to the processing element 46 in which an operation yet to be described is performed. The result E is used as a threshold value and is applied to the discriminator 28 which is connected in series with the delay element 62. The element 22 is a memory for the mean grey values and operates as a shift register. The delay time corresponds to the length of a television line. Element 24 corresponds to element 22, but has a delay time which corresponds to the scanning period of the pixels. The situation of the pixels associated with the signals "C" and "D" is shown in FIG. 5b with respect to the actual pixel (X). Element 48 is an adder and element 50 is a divider-by-2. Thus, the signal $$"B" = \frac{C + D}{2}$$

is also applied to the processing element 46. The signals "A" and "B" are compared in the processing element 46. Several possibilities now exist:

(1) $|A-B| \leq \alpha \cdot B$, in which $\alpha$ is a small fraction, for example, 5%; in that case the value B is applied in the processing element 46 to the line 44 for further use;

(2) $\alpha \cdot B < A-B \leq \beta \cdot B$, in which $\beta$ is a fraction which is larger than $\alpha$, for example, equal to 10%. In that case the value 1.05. B is calculated in the processing element 46 for supply to the line 44.

(3) $\alpha \cdot B < B-A \leq \beta \cdot B$. In that case the value 0.95 B is calculated in the processing element 46 in order to be supplied to the line 44.

(4) $|B-A| > \beta \cdot B$ In that case the value A is applied to the line 44 in the processing element 46.

The processing element 46 may be constructed as a simple microprocessor. Other values may be chosen for $\alpha$, $\beta$ and the values 0.95 and 1.05. In a simpler organization, $\alpha = \beta$ may be chosen, so that the cases (2) and (3) are not implemented. The cases (2) and (3), in which increment/decrement signals are given, relate to the phenomenon that in the image slow gradients are liable to occur in the grey values which are not related to the image content. Such gradients are caused, for example, by non-uniform illumination of an object. The gradient in the x-direction may be combined with a light/dark transition in the y-direction or another direction. The correct direction of transition is still found by incrementing/decrementing.

Element 28 is a comparison element, so that a binarized black/white transition can appear on output 30. The elements 32 and 34 correspond to the elements 90 and 92 in FIG. 4. Element 26 corresponds to element 98 in FIG. 4. Thus, on the output 38 a binary signal appears which indicates whether the signals on the output 30 are relevant or not.

The foregoing description dealt with the serial reception of the information of the grey values. In the case of parallel presentation of the information, the relevant part of the device may be constructed to be multiple in a customary manner. Furthermore, no synchronizing clock signals have been mentioned in the foregoing. Furthermore, in given cases the signals "start new image", "end of image", "end of line" may be necessary.

DESCRIPTION OF THE PARTS OF FIG. 3

Embodiments of the parts of FIG. 3 will be described in detail hereinafter. It will appear that in some cases several functions are embodied in one device. It is assumed that the two-dimensional image is scanned in a sequence of lines, for example, like in a television camera.

Figure 6:
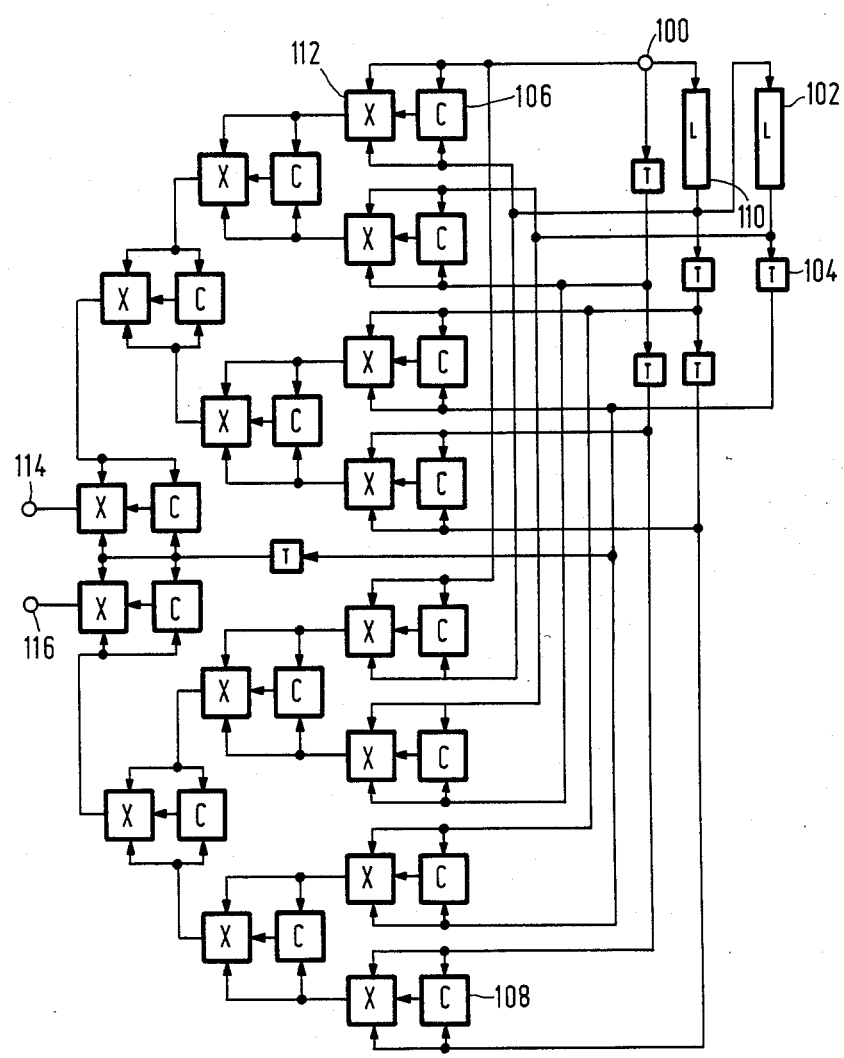
FIG. 6 shows an element for determining the highest/lowest grey values, FIGS. 7a, b show an element for detecting an edge between darker and lighter pixels in order to form an accept/reject signal.

FIG. 6 shows an embodiment of the element 72 for determining the highest and the lowest grey values in a local sub-set of 3×3 pixels. Elements such as the element 102 (marked L) are delay elements with a delay time which corresponds to the length of one television line. Elements such as the element 104 (marked T) are delay elements with a delay time which corresponds to the scanning time of one pixel. Using two elements L and six elements T, always the information of a sub-set of 3×3 pixels is applied to the remainder of the circuit. This information is received on input 100. Elements which are denoted by C, such as the elements 106 and 108, are comparison elements which each time compare two grey values received. When the element 106 detects that the last pixel received has a grey value which is higher than that available on the output of the delay element 110 (one television line earlier), the element 106 controls demultiplexer 112 in order to conduct the former grey value. In the other case, the latter grey value is conducted. The upper half of the Figure shows eight of such combinations, so that ultimately the highest one of the nine grey values appears on output 114. Similarly, the eight combinations of comparison element plus selector supply the lowest one of the nine grey values to output 116 in the lower half. For other numbers of pixels to be treated together, a corresponding device can be constructed.

Figure 7A:
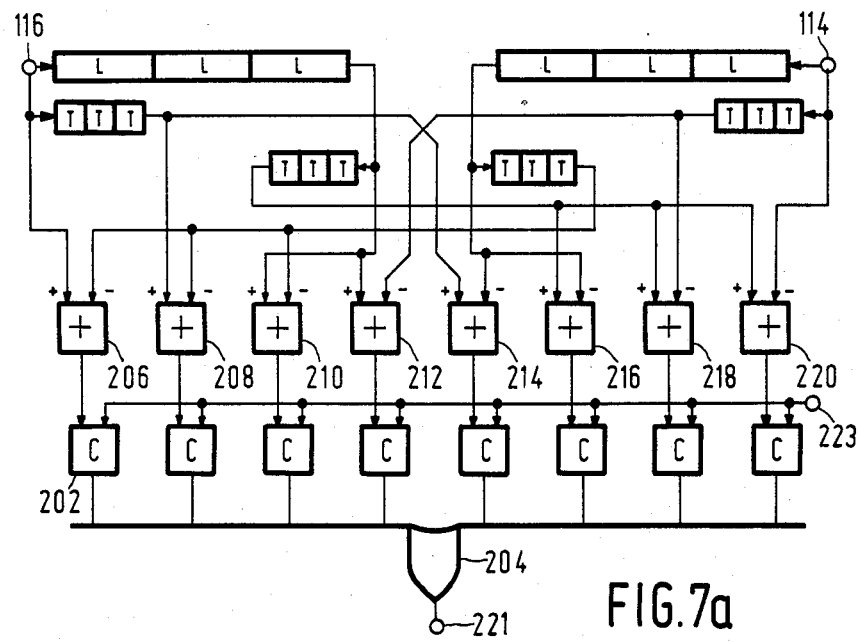
Figure 7B:
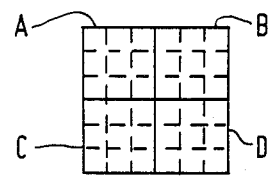

FIG. 7a shows an embodiment of the elements 76 and 80 in FIG. 3 for determining whether an edge between darker and lighter pixels is present in a given set (subset) of pixels. The number of pixels simultaneously considered amounts to 6×6 as indicated in FIG. 7b. The input 114 recieves each time the highest grey value of a group of nine pixels (FIG. 6), while the input 116 receives the lowest grey values of the same group. Using six delay elements L and twelve delay elements T, the highest and lowest grey value of each of the four sections A, B, C, D in FIG. 7b is applied to the difference-determining devices 206 . . . 220. It is assumed that a gradient is present if the lowest grey value in a section of 3×3 pixels exceeds the highest grey value in another section of 3×3 pixels by at least a predetermined amount. Thus, the following differences are determined:

| in element | the difference between |
| --- | --- |
| 206 | D low, A high |
| 208 | C low, A high |
| 210 | B low, A high |
| 212 | B low, C high |
| 214 | C low, B high |
| 216 | A low, B high |
| 218 | A low, C high |
| 220 | A low, D high |

The elements denoted by the letter "C", like the element 202, are comparison elements which compare the difference formed, which may be positive as well as negative, with a standard difference on terminal 233 (for example, supplied by the element 78 of FIG. 3). The relevant comparison element supplies a logic "1" only if the difference is larger than the positive standard difference. These output signals are combined in OR-gate 204. An accept signal as previously described (FIGS. 1, 2) is produced only if the terminal 206 carries a logic "1". The addition of the circuit shown in FIG. 7a is attractive when the image exhibits noise phenomena. If hardly any noise is present, the difference determining device 202 (a single device then suffices) can be connected directly to the terminals 114, 116.

So-called gradual shades occur in given images, that is to say zones having a small but uniform gradient in the grey values. Such zones may not cause an accept signal; this can be achieved as follows. The output signals of the circuit shown in FIG. 6 are used. First the absolute value of the difference of these signals is determined. This absolute difference is treated in the same way as the maximum and the minimum grey values of FIG. 7a; let the notation for this difference be VA, VB, VC, VD, the letters A . . . D indicating the location in accordance with FIG. 7b. The terminals 114, 116 are now interconnected, which means that double use can be made of the delay elements L, T for the sake of simplicity. Again a signal is obtained from the output of the OR-gate when a gradient variation has occurred. The comparison variable on the input 206 can be formed by the mean gradient.

Figure 8:
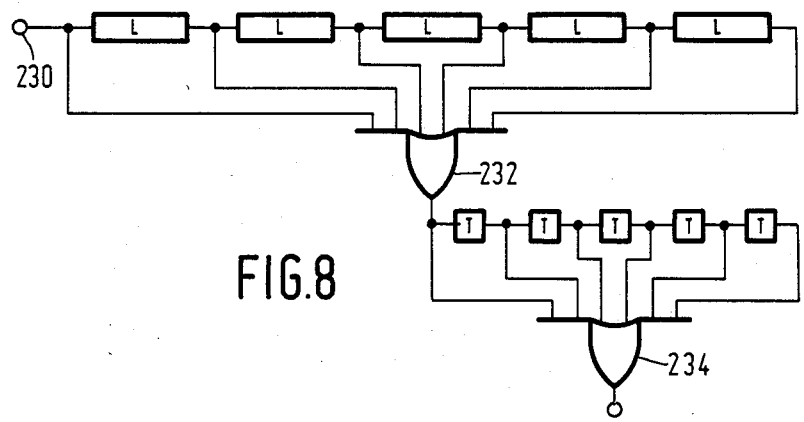
FIG. 8 shows a circuit for expanding the detection of an edge signal, and FIGS. 9a . . . e show a resolution enhancer.

FIG. 8 shows a circuit for expanding the detection of an edge signal over a number of pixels (in this case a sub-matrix of 6×6 pixels). The edge signal which is generated, for example, by the OR-gate 204 in FIG. 7a is applied to OR-gate 232 via 5 delay lines having a length of one image line and via six branch points. The same is performed again with five delay elements, each of which introduces a delay equal to the period of one pixel, via OR-gate 234. In FIG. 3, such a circuit may be connected in front of as well as behind the discriminator 80. The width of the information stored is smaller in the latter case.

The delay in the element 62 in FIG. 3 is determined from the delays incurred in the remainder of the circuit. The maximum delay in FIG. 6 amounts to two lines plus two pixels. The maximum delay in FIG. 7a amounts to three lines plus three pixels. Using a slightly different arrangement of the comparison elements of the multiplexers in FIG. 6, the information of maximum/minimum grey value of a two-by-two local sub-set of pixels can also be produced at an intermediate point of the circuit. The element 74 may then simply be an adder cum divider by two.

Figure 10:
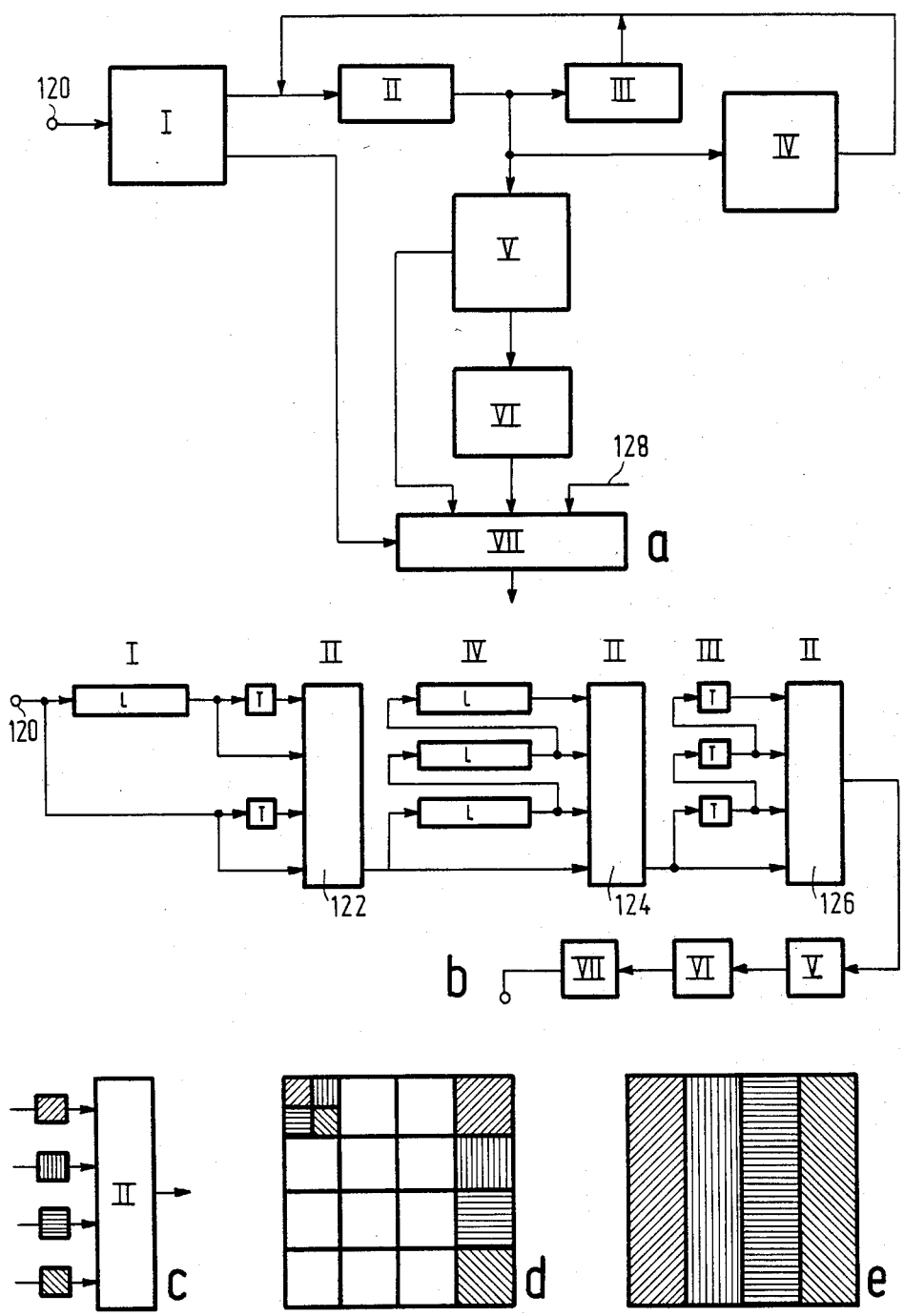
FIGS. 10a . . . e show a further black diagram of a part of the device in accordance with the invention.

In order to reduce the number of components required in FIG. 6, the design may be slightly modified: first the determination of maximum and minimum grey values is performed for a 2×2 sub-matrix of pixels, that is to say each time for mutually exclusive sub-matrices of this kind; this is performed, for example, after each even pixel on an image line and for the remainder only during the even image lines. The maximum/minimum grey values thus formed are subsequently delayed over zero, two, four and six image lines, and are applied to an element for the processing of the grey values thus presented in order to determine the highest and the lowest values; the latter results are applicable to a zone of 2×8 pixels distributed over 8 lines. The latter determination, for example, can be performed exclusively during the presentation of the odd image lines; an additional delay of one line if then still required, but the same maximum/minimum determination device can be used via time multiplexing. The results thus formed are subsequently delayed over 0, 2, 4, 6 pixels, after which the highest and the lowest grey values are determined again. This can be performed in an alternating manner with respect to the former determination by means of an additional delay of one pixel and time multiplexing. The values thus found are applicable to a section of 8×8 pixels. Each time the highest/lowest grey value is thus found for an associated local sub-set of pixels in the vertical as well as the horizontal direction for alternating pixels. They can be processed further in the described manner, see also FIG. 10.

Figure 9:
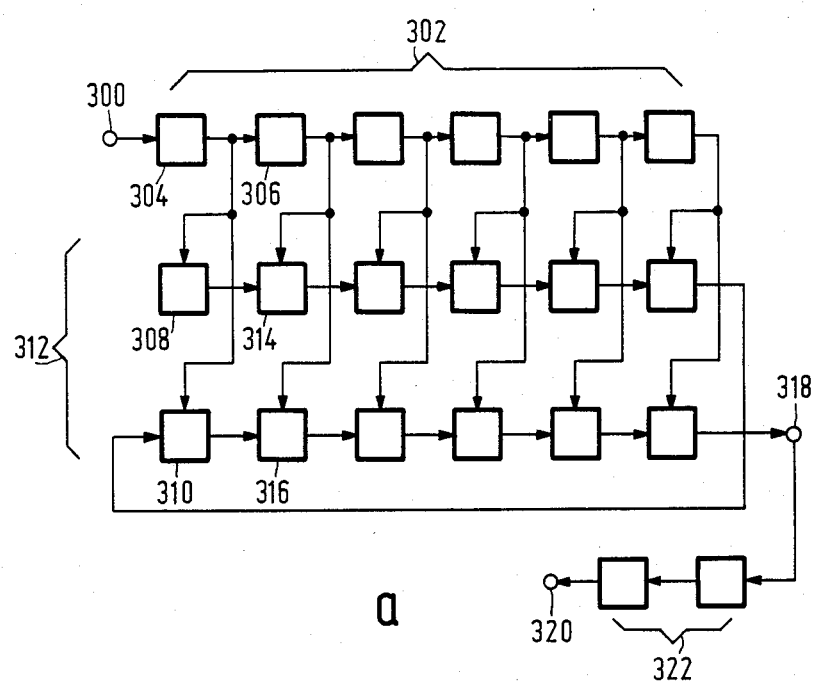
Figure 9:
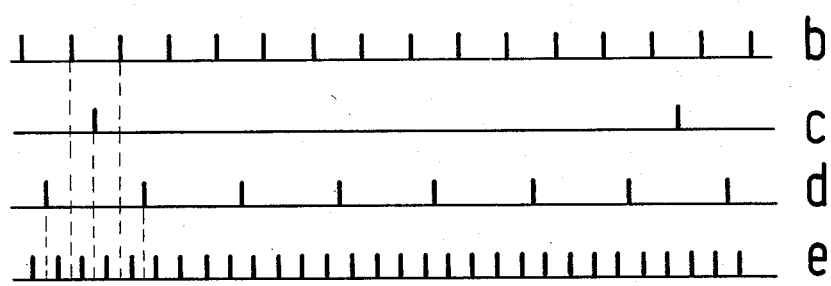

FIG. 9 shows a resolution enhancer. When an image containing grey value is converted into a binary image, it appears that, due to the coarseness of the definition, smooth edges are converted into stepped structures. Due to the coarseness, as if it were a noise phenomenon occurs in the shape of the edge. By enhancement of the resolution, this coarseness is reduced: the edge in the binary image is smoother. The resolution enhancer shown operates for images having a width of six pixels which are line-wise scanned. The resolution enhancement is a factor 2 in both co-ordinate directions, without loss of information. The information arrives on input 300 and is successively stored in a shift register 302. Each of the stages 304 thereof has an appropriate storage capacity for the grey values, for example, 5 bits in parallel. The shift pulses for the shift registers are shown in FIG. 9d and originate from a clock (not shown). Each time after six clock pulses in FIG. 9d, a transfer control pulse appears for the series which is shown in FIG. 9c. Consequently, the information of the shift register 302 is transferred parallel-wise to the shift register 312: the information of stage 304 to the two stages 308, 310, the information of the stage 306 parallel-wise to the stages 314, 316 and so on.

FIG. 9b shows the shift control pulses for the shift register 312: the frequency of these pulses is twice as high as that in FIG. 9d. The right-hand side of the upper half of this shift register is coupled to the left-hand side of the lower half as indicated. The grey values appear on the output 318: the resolution is thus increased by a factor two in the column direction. The output 318 is coupled to an output shift register 322. FIG. 9e shows the clock pulses for the latter shift register: the information on the output 318 is each time taken over twice in order to be presented on the output 320. The resolution is thus also increased by a factor two in the row direction. The remainder of the system is controlled with a higher clock pulse frequency (as shown in FIG. 9e). Finally, a filtering operation (not shown) is performed. A simple version consists in that each time the mean grey value of a sub-matrix of 2×2 pixels is determined for imaging on a secondary pixel which corresponds to the position of the sub-matrix. The pixels of such a 2×2 matrix to be averaged, therefore, do not always originate from the same original pixel (only in a 1/(m×n) fraction of the total number of secondary pixels). In a more elaborate case, each secondary pixel is formed on the basis of 4×4 pixels after the resolution enhancer. The weighting coefficients are not equal in that case. It has been found that it is advantageous to use a weighting coefficient 2 for the four central pixels and a weighting coefficient 1 for the other pixels. In given cases the described device has the drawback that the pixel frequency becomes too high. It is to be noted that, be it at the expense of some loss of information, the advantageous effects of a resolution enhancer can also be achieved to a given extent by means of a low-pass filter.

FIGS. 10a . . . e show a further block diagram of a part of a device in accordance with the invention and also some illustrations of its operation. Emphasis is placed on the saving of components. FIG. 10b shows the device as it could be constructed without such savings. The information arrives on input 120, for example, as 8-bit video data. The line delay unit L and the pixel delay units T in the section I present the information of a 2×2 pixel matrix to the maximum/minimum determining device 122. The mutual position of these pixels is shown at the top left in FIG. 2d. In a matrix of 8×8 pixels each time four pixels are treated in one of the sixteen sub-matrices shown in order to determine the maximum and the minimum signal value. The operation of the determining device 122 is symbolized in FIG. 10c in which the four signals are distinguished by four different shadings. The maximum/minimum determining device may again comprise an internal organization for 2×2 data in accordance with FIG. 6. The determining device 122 only need perform a determination on alternating lines at half the pixel frequency. Using delays, the relevant maximum/minimum values from the device 122 are delayed and presented to a maximum/minimum determining device 124. The latter thus receives the relevant values (four maximum and four minimum) for the sixteen pixels indicated at the right in FIG. 10d by the different shadings. Therefrom the absolute maximum/minimum is determined. The section IV is driven at half the pixel frequency which is the same as that used for the device 122. The effective delay time equals two image lines. This can be realized in two ways: before each activation the maximum and the minimum value are input, so that the full clock frequency is again active within the register. Shifting is then completely stopped during alternating lines. A further solution is offered by parallel operation (not shown), during which the maximum and minimum values are loaded and shifted in parallel. The device 124 acts on alternaing pixels for alternating image lines. Again using delays over two pixels, in unit III the relevant information for a matrix of 8×8 pixels is presented to a maximum/minimum determining device 126; the relevant matrix is again represented by shadings in FIG. 10e. The same is applicable to the delay unit III as to the delay unit IV: the determining devices 124, 126 are activated only on alternating lines and alternating pixels. FIG. 10a shows the actual hardware configuration. The units I, III and IV are also shown in FIG. 10b. The unit II performs the function of the determining devices 122, 124, 126, because the latter can be operated (also in time multiplex) by means of a single sub-system. Block V treats the maximum/minimum information of an 8×8 pixel matrix in order to determine the contrast. The contrast is applied to the element III, the mean value being applied to the element VI. The element VI is a buffer for introducing the appropriate delay. The signal value of the pixel to be discriminated is applied from element I to element VII. In element VII, the signal value of the pixel to be discriminated is compared with the mean value determined by the element V and is converted into a bivalent signal. Moreover, the contrast is compared with a contrast threshold value on input 128 in order to form an artefact blocking signal or reject signal or not. Element VI also comprises an interpolator for forming an interpolated mean value for the pixels for which the mean value is not directly determined. FIG. 10b is only a pro forma representation of the circuit as far as the elements V-VII are concerned.

What is claimed is:
1. A device for the dynamic adjustment of a black/white discrimination threshold for the processing of images which are composed of a matrix of pixels which each contain a grey value and which are arranged in rows and columns of the matrix, said device comprising:
   a. a first input (60) for receiving the grey values;
   b. a threshold generator (68) which comprises:
      b1. first means (72, 74) for receiving the grey values of a first sequence of first local sub-sets of pixels and for determining for each first local sub-set a local black/white threshold for presentation on a first output;
   c. a discriminator (64) for presenting alternatively a black or a white signal on a second output (66) by comparison of the grey value of a pixel with the local black/white threshold applicable to the relevant pixel, characterized in that the threshold generator comprises:
      b2. an edge detector which comprises a second input which is connected to said first input in order to receive the grey values of a second sequence of second local sub-sets of pixels for the detection of a local edge between darker pixels and lighter pixels, thus forming an accept signal on a third output (82), but forming a reject signal on the third output in the absence of such a local edge;
   there are also being provided:

d. time control means (62) for presenting a black/-white signl of a pixel, on the basis of a first local sub-set of pixels to the second output together with the accept/reject signal on the third output which has been generated on the basis of a second local sub-set of pixels associated with said first local sub-set of pixels.

2. A device as claimed in claim 1, characterized in that the locally determined threshold value is formed as a mean value of the maximum and minimum grey values within the first local sub-set.

3. A device as claimed in claim 1, characterized in that the edge detector determines an edge under the control of a difference between a minimum grey value in a first sub-set and a maximum grey value in a second sub-set within said second local sub-set.

4. A device as claimed in claim 2, characterized in that a first local sub-set of pixels each time coincides with a second local sub-set of pixels.

5. A device as claimed in claim 1, characterized in that after the first input and before further processing means there is arranged a resolution enhancer (86) for forming, for each pixel received, a larger number of m×n secondary pixels of an m×n submatrix which is situated in the area of the pixel received, the secondary grey values of the secondary pixels being formed by means of m×n interpolation operations on the grey value of the pixel received and on the grey values of a third local sub-set of pixels which directly adjoin the pixel received.

6. A device as claimed in any one of claims 1 to 4, characterized in that to the input of the threshold detector there is connected a low-pass filter (70) for receiving the grey values of a sequence of third local sub-sets of pixels and for performing an averaging operation thereon.

7. A device as claimed in claim 2, characterized in that said first means and the edge detector are constructed as a tree structure consisting of two-input arithmetic elements, each time two outputs of arithmetic elements of higher level in the tree structure being connected to the relevant inputs of a single arithmetic element of a lower level in the tree structure.

8. A device as claimed in claim 7, characterized in that the tree structure determines the highest as well as the lowest grey value of the relevant local sub-set.

9. A device as claimed in claim 1, characterized in that the threshold generator also comprises: a memory (22) which comprises a third input which is connected to the first output and to a fourth output in order to buffer a local black/white threshold, and a difference-determining device (46) which comprises a fourth and a fifth input for comparing the local black/white thresholds on the first and the fourth output and, when a predetermined difference between said local black/white thresholds is exceeded, for supplying the memory with a storage control signal in order to store a new local black/white threshold for presentation to said discriminator.

10. A device as claimed in claim 9, characterized in that when said difference is not zero but does not exceed a second predetermined difference, the difference-determining device supplies an increment/decrement signal in order to increment/decrement the stored local black/white threshold in the same direction as the variation of the grey values.

* * * * *